(12) United States Patent
Bulgrien et al.

(10) Patent No.: US 10,227,942 B2
(45) Date of Patent: Mar. 12, 2019

(54) SYSTEM AND METHOD FOR CONTROLLING A POWERSHIFT TRANSMISSION

(71) Applicant: CNH Industrial America LLC, New Holland, PA (US)

(72) Inventors: Garth Harvey Bulgrien, Ephrata, PA (US); Brent Lynn Gustafson, Mapleton, ND (US); Kushan Vora, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/166,429

(22) Filed: May 27, 2016

(65) Prior Publication Data
US 2017/0198808 A1    Jul. 13, 2017

Related U.S. Application Data

(60) Provisional application No. 62/277,408, filed on Jan. 11, 2016.

(51) Int. Cl.
*F16H 61/02* (2006.01)
*F02D 41/10* (2006.01)
(Continued)

(52) U.S. Cl.
CPC ............. *F02D 41/10* (2013.01); *A01B 71/06* (2013.01); *A01B 76/00* (2013.01); *B60K 17/02* (2013.01); *B60K 17/28* (2013.01); *B60K 25/02* (2013.01); *B60W 10/06* (2013.01); *B60W 10/11* (2013.01); *B60W 30/1882* (2013.01); *F02D 29/02* (2013.01); *F02D 31/002* (2013.01); *F02D 41/26* (2013.01); *F16D 25/14* (2013.01); *F16D 48/06* (2013.01); *F16D 48/066* (2013.01); *F16H 61/0204* (2013.01); *F16H 61/0213* (2013.01); *B60W 2510/0638* (2013.01); *B60W 2510/0666* (2013.01); *B60W 2510/1005* (2013.01);
(Continued)

(58) Field of Classification Search
CPC .............. F16H 61/0204; F16H 61/08; F16H 2342/00–2342/10; F16H 2306/46; F16H 2306/50
See application file for complete search history.

(56) References Cited

U.S. PATENT DOCUMENTS

| 4,102,222 A | 7/1978 | Miller et al. |
| 4,370,903 A | 2/1983 | Stroh et al. |

(Continued)

*Primary Examiner* — Ramya P Burgess
*Assistant Examiner* — David R Morris
(74) *Attorney, Agent, or Firm* — Rickard K. DeMille; Rebecca L. Henkel

(57) ABSTRACT

An agricultural vehicle includes an engine, a transmission driven by the engine, and a controller. The controller, in operation, adjusts a gear ratio of the transmission using an algorithm. The algorithm, in operation, performs the following steps: reduce a torque capacity of a first offgoing clutch of the transmission to a first torque target, reduce the torque capacity of the first offgoing clutch to a second torque target while adjusting the torque capacity of a first oncoming clutch of the transmission to a third torque target, such that the gear ratio of the transmission is modified in a first direction, and increase the torque capacity of the first oncoming clutch to a desired torque capacity.

13 Claims, 10 Drawing Sheets

(51) Int. Cl.
*B60W 30/188* (2012.01)
*B60W 10/06* (2006.01)
*B60W 10/11* (2012.01)
*A01B 76/00* (2006.01)
*F02D 29/02* (2006.01)
*F02D 31/00* (2006.01)
*F02D 41/26* (2006.01)
*B60K 17/02* (2006.01)
*B60K 17/28* (2006.01)
*F16D 48/02* (2006.01)
*F16D 48/06* (2006.01)
*A01B 71/06* (2006.01)
*B60K 25/02* (2006.01)
*F02D 41/14* (2006.01)
*F02D 41/02* (2006.01)
*F16H 59/14* (2006.01)

(52) U.S. Cl.
CPC ............. *B60W 2710/0677* (2013.01); *B60W 2710/1005* (2013.01); *B60Y 2200/221* (2013.01); *F02D 41/023* (2013.01); *F02D 2041/1409* (2013.01); *F02D 2200/101* (2013.01); *F02D 2200/1004* (2013.01); *F16D 2500/1027* (2013.01); *F16D 2500/10437* (2013.01); *F16D 2500/111* (2013.01); *F16D 2500/30421* (2013.01); *F16D 2500/30426* (2013.01); *F16D 2500/30428* (2013.01); *F16D 2500/3165* (2013.01); *F16D 2500/5048* (2013.01); *F16D 2500/50287* (2013.01); *F16D 2500/50296* (2013.01); *F16D 2500/70418* (2013.01); *F16D 2500/70663* (2013.01); *F16D 2500/70673* (2013.01); *F16H 2059/147* (2013.01); *F16H 2061/0216* (2013.01); *F16H 2306/46* (2013.01); *F16H 2306/50* (2013.01)

(56) References Cited

U.S. PATENT DOCUMENTS

| | | | |
|---|---|---|---|
| 4,527,678 A * | 7/1985 | Pierce | F16D 43/28 192/3.58 |
| 5,573,476 A | 11/1996 | Minowa et al. | |
| 6,063,003 A | 5/2000 | Kubota et al. | |
| 6,254,511 B1 * | 7/2001 | Esterby | F16H 61/0437 477/121 |
| 6,261,204 B1 | 7/2001 | Gierer et al. | |
| 7,300,381 B2 | 11/2007 | Badillo et al. | |
| 7,775,935 B2 | 8/2010 | Dickinson | |
| 7,789,798 B2 | 9/2010 | Chen | |
| 7,894,965 B2 | 2/2011 | Dourra et al. | |
| 8,113,989 B2 * | 2/2012 | MacFarlane | F16H 61/061 477/143 |
| 8,862,352 B2 * | 10/2014 | Wilke | F16H 61/684 477/176 |
| 8,886,425 B2 | 11/2014 | Doering et al. | |
| 8,965,650 B1 | 2/2015 | Otanez et al. | |
| 9,028,365 B2 * | 5/2015 | Yanakiev | F16H 61/061 477/83 |
| 9,308,908 B2 * | 4/2016 | Chen | F16H 61/0437 |
| 2006/0089775 A1 * | 4/2006 | Whitton | F16H 61/061 701/51 |
| 2008/0125267 A1 * | 5/2008 | Dourra | F16H 61/061 475/123 |
| 2010/0087293 A1 * | 4/2010 | MacFarlane | F16H 61/061 477/144 |
| 2013/0008754 A1 * | 1/2013 | Wilke | F16H 61/684 192/3.54 |
| 2014/0274559 A1 * | 9/2014 | Yanakiev | F16H 61/061 477/83 |
| 2015/0105218 A1 * | 4/2015 | Chen | F16H 61/0437 477/109 |

* cited by examiner

US 10,227,942 B2

SYSTEM AND METHOD FOR CONTROLLING A POWERSHIFT TRANSMISSION

CROSS REFERENCE TO RELATED APPLICATIONS

This application claims priority from and the benefit of U.S. Provisional Patent Application No. 62/277,408, entitled "TRANSMISSION AND POWER TAKE-OFF SYSTEMS FOR AN OFF-ROAD VEHICLE," filed Jan. 11, 2016, which is hereby incorporated by reference in its entirety.

BACKGROUND

The present application relates generally to transmissions, and more particularly, to an algorithm for controlling power shift transmissions.

Various types of agricultural vehicles (e.g., tractors, floaters, sprayers, or the like) may be used to plow a field, till land, plant seeds, or accomplish other similar agricultural operations. Typical agricultural vehicles include an engine configured to power the vehicle, and a transmission configured to transfer engine power to rotating wheels at a desired gear ratio. Some agricultural vehicles include controllers that categorize various powershifts of a transmission of the agricultural vehicle. Unfortunately, creating an algorithm for each powershift category may be expensive and complex.

BRIEF DESCRIPTION

In one embodiment, an agricultural vehicle includes an engine, a transmission driven by the engine, and a controller. The controller, in operation, adjusts a gear ratio of the transmission using an algorithm. The algorithm, in operation, performs the following steps: reduce a torque capacity of a first offgoing clutch of the transmission to a first torque target, reduce the torque capacity of the first offgoing clutch to a second torque target while adjusting the torque capacity of a first oncoming clutch of the transmission to a third torque target, such that the gear ratio of the transmission is modified in a first direction, and increase the torque capacity of the first oncoming clutch to a desired torque capacity.

In another embodiment, an agricultural vehicle includes an engine, a transmission with multiple gear ratios driven by the engine, and a controller. The controller, in operation, performs the following steps: reduce a torque capacity of a first offgoing clutch of the transmission to a first torque target during a fill phase of a transmission shift, adjust the torque capacity of a first oncoming clutch of the transmission to a second torque target during an activation phase of the transmission shift, such that a gear ratio of the transmission shift is modified in a first direction during a slip phase of the transmission shift, and increase the torque capacity of the first oncoming clutch to a desired torque capacity during a final phase of the transmission shift.

In another embodiment, a method includes reducing a torque capacity of a first offgoing clutch of a transmission to a first torque target, reducing the torque capacity of the first offgoing clutch to a second torque target while adjusting the torque capacity of a first oncoming clutch of the transmission to a third torque target, such that a gear ratio of the transmission is modified in a first direction, and increasing the torque capacity of the first oncoming clutch to a desired torque capacity.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The embodiments disclosed herein relate to a system that includes a controller configured to reduce a number of powershift logic categories to simplify and enhance powershifting of an agricultural vehicle transmission. For example, agricultural vehicle transmissions may include numerous types of powershifts, such as single clutch swaps, double clutch swaps, and triple clutch swaps, depending on which sections of the transmission are accessed. While embodiments of the present disclosure focus on double clutch swaps, it should be recognized that the present disclosure also applies to single clutch swaps, triple clutch swaps, or other multi-clutch swaps. Traditionally, upshifts, downshifts, negative-load shifts, positive-load shifts, and combinations thereof, are categorized separately. As a result, the controller may include an algorithm for each powershift category, which may complicate powershifting optimization.

It is now recognized that it may be desirable to reduce a number of powershift categories to simplify logic included in the controller used to shift between gears of the transmission. Simplification of the controller logic may enhance performance of the agricultural vehicle. Embodiments of the present disclosure include techniques for shifting between gears of a transmission with a single control algorithm regardless of whether an estimated torque is positive or negative and regardless of whether performing an upshift or a downshift (e.g., increasing or decreasing a gear ratio of the transmission). The single control algorithm may utilize one or more torque targets calculated based on the estimated torque, a measured torque, and/or a desired torque input by an operator. The algorithm may be utilized to control various types of powershifts, such as driving shifts, resisting shifts, and/or transitional shifts.

As used herein, a driving shift may include a shift in which a clutch of the transmission overcomes an applied load to adjust a gear ratio of the transmission (e.g., upshifting when driving uphill and/or downshifting when driving downhill). Conversely, a resisting shift may include a shift where the clutch resists a change in gear ratio thereby causing the shift to occur at a reduced speed (e.g., downshifting when driving uphill and/or upshifting when driving downhill). As used herein, a transitional shift may include a shift that occurs under conditions between a driving shift and a resisting shift (e.g., the applied load is within an intermediate range between the applied loads of a driving shift and a resisting shift).

Figure 1:
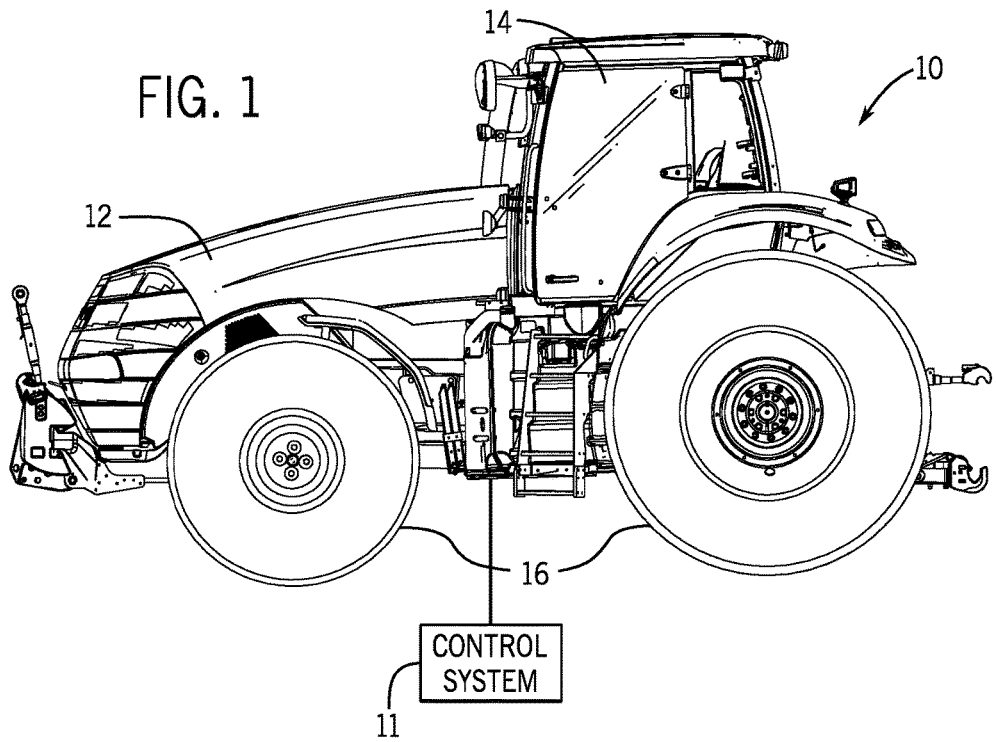
FIG. 1 is a schematic side view of an embodiment of an agricultural vehicle, in accordance with an aspect of the present disclosure.

With the foregoing in mind, FIG. 1 is a perspective view of an embodiment of an off-road vehicle 10 having a control system 11. In the illustrated embodiment, the vehicle 10 is an agricultural tractor. However, any suitable off-road vehicle, including combines, trucks, and so forth, may utilize aspects of the disclosed embodiments. In the illustrated embodiment, the vehicle 10 includes a body 12 and a cabin 14 in which an operator may sit to operate the vehicle 10. The body 12 may house an internal combustion engine, a transmission, and a power train for driving one or more wheels 16. It should be understood that in some vehicles such wheels 16 may be replaced with tracks or other drive systems. As discussed in more detail below, the agricultural vehicle 10 may include the control system 11. The control system 11 may be configured to instruct the transmission to shift gears using a single control algorithm regardless of the type of shift being performed.

Figure 2:
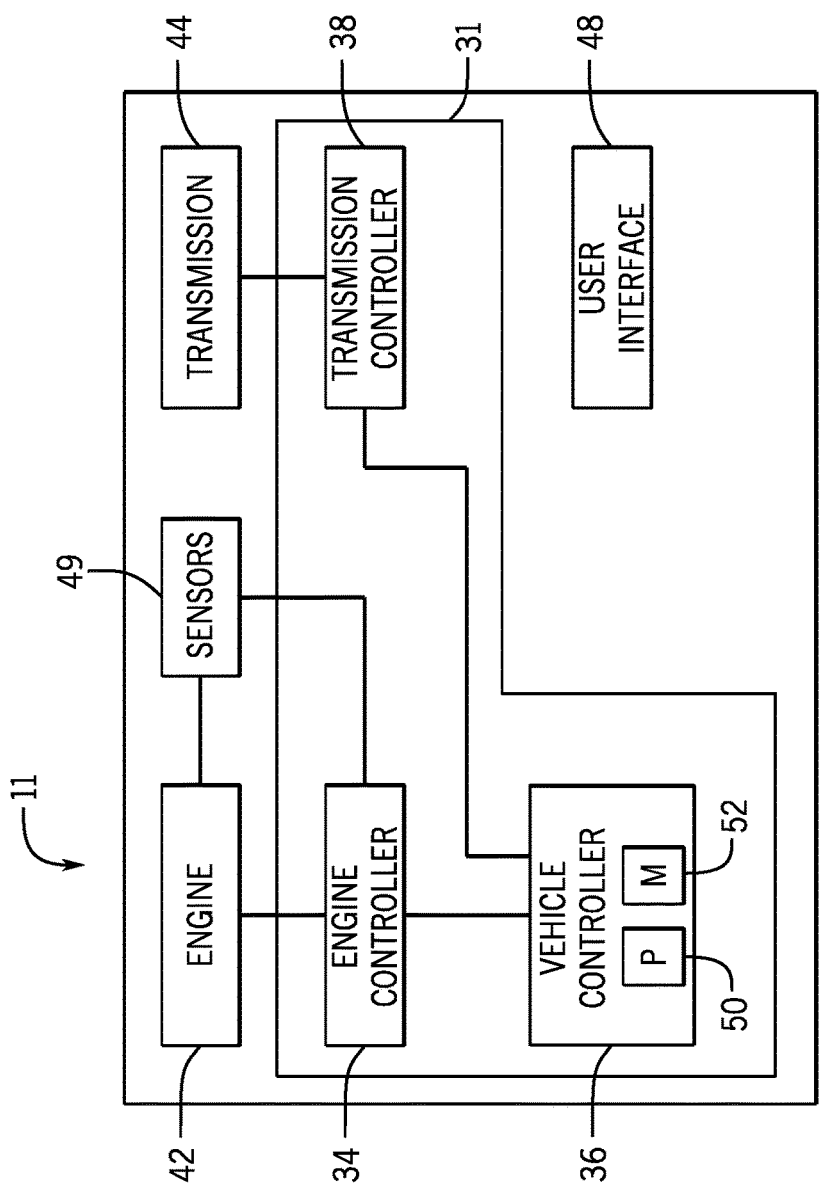
FIG. 2 is a block diagram of an embodiment of a control system that may be utilized to control the agricultural vehicle of FIG. 1, in accordance with an aspect of the present disclosure.

FIG. 2 depicts a block diagram of an embodiment of the control system 11 that may be utilized to control the vehicle 10 of FIG. 1. The control system 11 includes an engine controller 34, a vehicle controller 36, and a transmission controller 38. As will be appreciated, the controllers 34, 36, and 38 may each include one or more processors, memory devices, and/or storage devices. Furthermore, the engine controller 34 and the transmission controller 38 are communicatively coupled to the vehicle controller 36. In this configuration, the controllers 34, 36, and 38 function cooperatively to control operation of an engine 42 and a transmission 44. The engine controller 34 is configured to control the engine 42, and the transmission controller 38 is configured to control the transmission 44. The engine 42 may be any suitable device configured to transfer torque to the transmission system 44. The transmission controller 38 may instruct the transmission 44 to shift gears (e.g., upshift or downshift). As will be discussed in more detail herein, shifting gears of the transmission 44 may be controlled by a single algorithm regardless of the type of shift to be performed.

In certain embodiments, the transmission 44 is a step ratio transmission that includes multiple discrete gears (e.g., as compared to a continuously variable transmission). Each gear of the transmission has an associated gear index and establishes a different gear ratio when selected. Increasing the gear index (e.g., upshifting) reduces the gear ratio, and decreasing the gear index (e.g., downshifting) increases the gear ratio. As shown, the control system 11 may also include a user interface 48.

In the illustrated embodiment, the engine controller 34 may receive signals from sensors 49 configured to output data indicative of a condition (e.g., speed and/or load) of the engine 42. In certain embodiments, the engine controller 34 may adjust the engine 42 such that the engine speed reaches a desired speed (e.g., by controlling an air/fuel flow into the engine). The vehicle controller 36 is communicatively coupled to the engine controller 34 and to the transmission controller 38. In the illustrated embodiment, the vehicle controller 36 includes a memory 50 and a processor 52. The memory 50 may be any type of non-transitory machine readable medium for storing data and executable instructions, such as random-access memory, read-only memory, rewritable flash memory, hard drives, optical discs, and the like. The processor 52 may execute instructions stored on the memory 50. For example, the memory 50 may contain machine readable code, such as instructions (e.g., the algorithm), that may be executed by the processor 52. In some embodiments, the memory 50 and the processor 52 of the vehicle controller 36 may instruct the engine controller 34 to adjust an engine speed and/or the transmission controller 38 to automatically shift (e.g., processor/memory controlled) between gears of the transmission 44, for example.

As discussed above, a single algorithm may be utilized to control shifting of the transmission 44. In certain embodiments, the algorithm may be stored in the memory 50 of the vehicle controller 36. The algorithm may be configured to control one or more clutches of the transmission 44. For example, the transmission 44 may include one or more primary clutches (e.g., a primary oncoming clutch and a primary offgoing clutch) and one or more secondary clutches (e.g., a secondary oncoming clutch and a secondary offgoing clutch). In other embodiments, the transmission 44 may not include the secondary clutches or may include additional clutches. As used herein, a primary clutch adjusts a gear ratio of the transmission 44 such that the gear ratio may approach a desired value, and a secondary clutch adjusts the gear ratio in the opposite direction of the primary clutch to partially offset the change in the gear ratio caused by the primary clutch. The algorithm may be configured to control the rate of change of the gear ratio during a driving shift by controlling the torque capacity of the primary oncoming clutch, thus controlling the rate at which slippage of the primary oncoming clutch reduces to zero. Additionally, the algorithm may be configured to control the rate of change of the gear ratio during a resisting shift by controlling the torque capacity of the primary offgoing clutch, thus controlling the rate at which slippage of the primary offgoing clutch increases from zero and the rate at which the slippage of the primary oncoming clutch reduces to zero.

Figure 3:
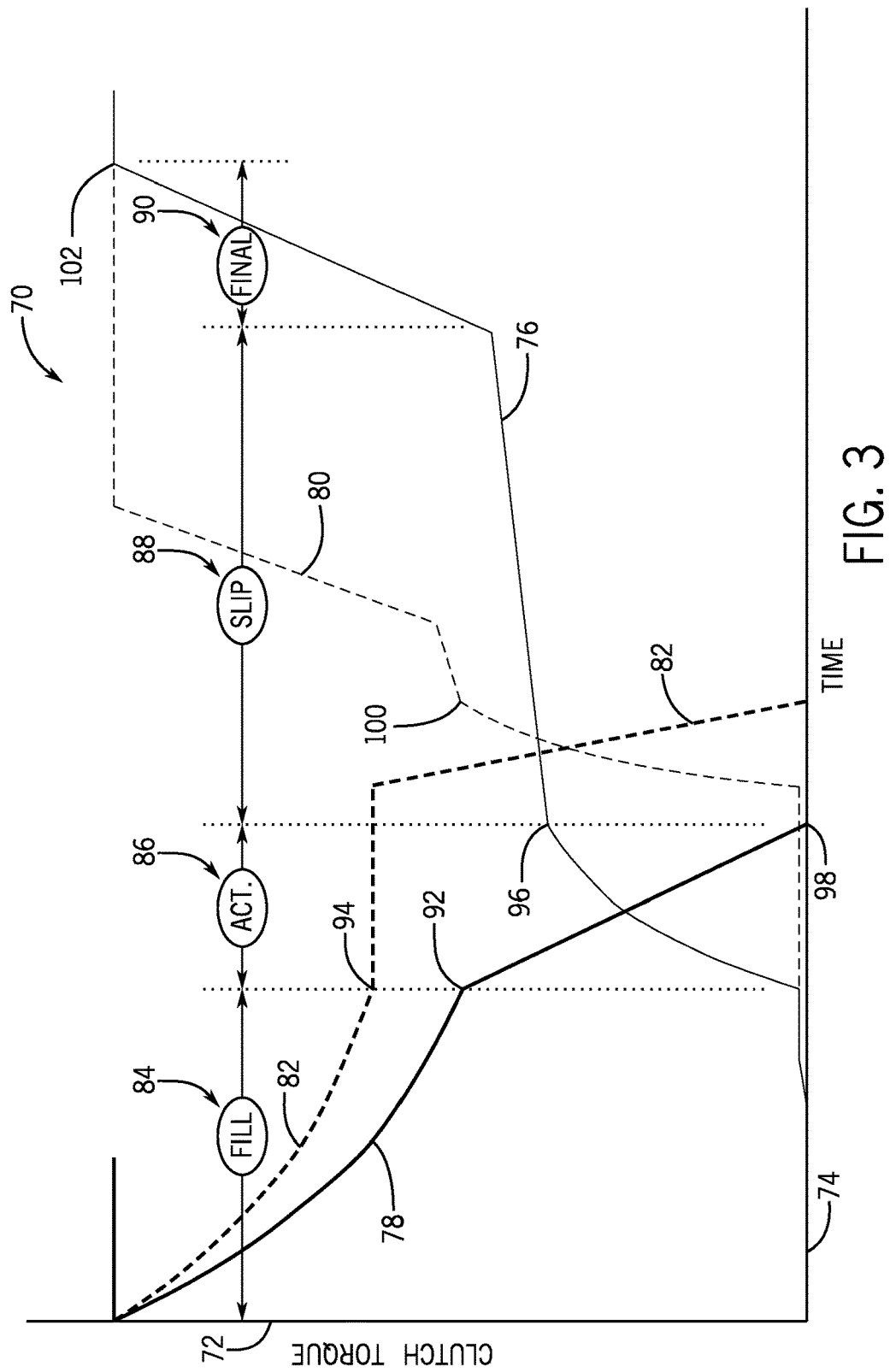
FIG. 3 is a graphical representation of clutch torque capacity over time for a closed loop driving shift at a relatively high torque, in accordance with an aspect of the present disclosure.

For example, FIG. 3 is a chart 70 of clutch torque capacity 72 as a function of time 74 for a closed loop driving shift at a relatively high torque. The chart 70 illustrates the torque capacity 72 of a primary oncoming clutch 76, a primary offgoing clutch 78, a secondary oncoming clutch 80, and a secondary offgoing clutch 82 as a function of time 74 (e.g., over four shift phases).

In some embodiments, a powershift of the transmission 44 may include one or more shift phases. As shown in the illustrated embodiment of FIG. 3, the closed loop powershift may include a fill phase 84, an activation phase 86, a slip phase 88, and a final phase 90. Conversely, during an open loop powershift (e.g., FIG. 8), the shift phases may include the fill phase 84 and the final phase 90. The shift phases 84, 86, 88, and/or 90 may be associated with one or more torque targets (e.g., torque capacities) of the various clutches that are determined based on a measured load torque, a desired load torque input by the operator, and/or an absolute value of the measured load torque and/or the desired load torque. Therefore, the torque targets may be determined regardless of whether the torque load is a positive or a negative value. Accordingly, the control system 11 may be configured to calculate and adjust a torque capacity of the primary and/or secondary clutches to approach the torque targets and perform the shift phases.

In some embodiments, the fill phase 84 may include filling oncoming clutches (e.g., the primary oncoming clutch 76 and the secondary oncoming clutch 80) until there is little or no clearance between clutch plates and reducing the torque capacity 72 of the offgoing clutches (e.g., the primary offgoing clutch 78 and the secondary offgoing clutch 82) by reducing a force applied to plates included within the clutches. For example, a first torque target value 92 (e.g., determined in part from the absolute value of the measured load torque) may be utilized to define a torque capacity of the primary offgoing clutch 78 at the end of the fill phase 84. In some embodiments, the first torque target 92 may be predetermined and stored in the memory 50 of the vehicle controller 36. In other embodiments, the first torque target 92 may be calculated using a look-up table, a chart, and/or an algorithm. In any case, the first torque target 92 may be greater than a torque large enough to carry a desired load of the transmission 44.

In addition a second torque target value 94 (e.g., determined in part from the absolute value of the measured load torque) may be used to define a torque capacity of the secondary offgoing clutch 82 at the end of the fill phase 84. The second torque target 94 may be predetermined, or the second torque target 94 may be determined using a look-up table, a chart, and/or an algorithm stored in the memory 50 of the controller 36. In any case, the second torque target 94 may be greater than a torque large enough to carry a desired load of the transmission 44.

Once the primary and secondary offgoing clutches 78 and 82 reach the first and second torque targets 92 and 94, respectively, the activation phase 86 may begin (e.g., during a closed loop powershift). During the activation phase 86, torque values of the oncoming clutches 76 and/or 80 may be increased to prepare for the gear ratio change. For example, a torque of the primary oncoming clutch 76 may be increased to a third torque target 96 (e.g., determined in part from the measured load torque) during the activation phase 86. As shown in the illustrated embodiment of FIG. 3, during a driving shift, the third torque target 96 may be greater than a torque large enough to carry a desired load of the transmission 44 without allowing the gear ratio to change in the wrong direction. Additionally, during a resisting shift (e.g., FIGS. 5 and 6), the third torque target 96 may remain substantially the same as a torque during the fill phase 84.

Figure 5:
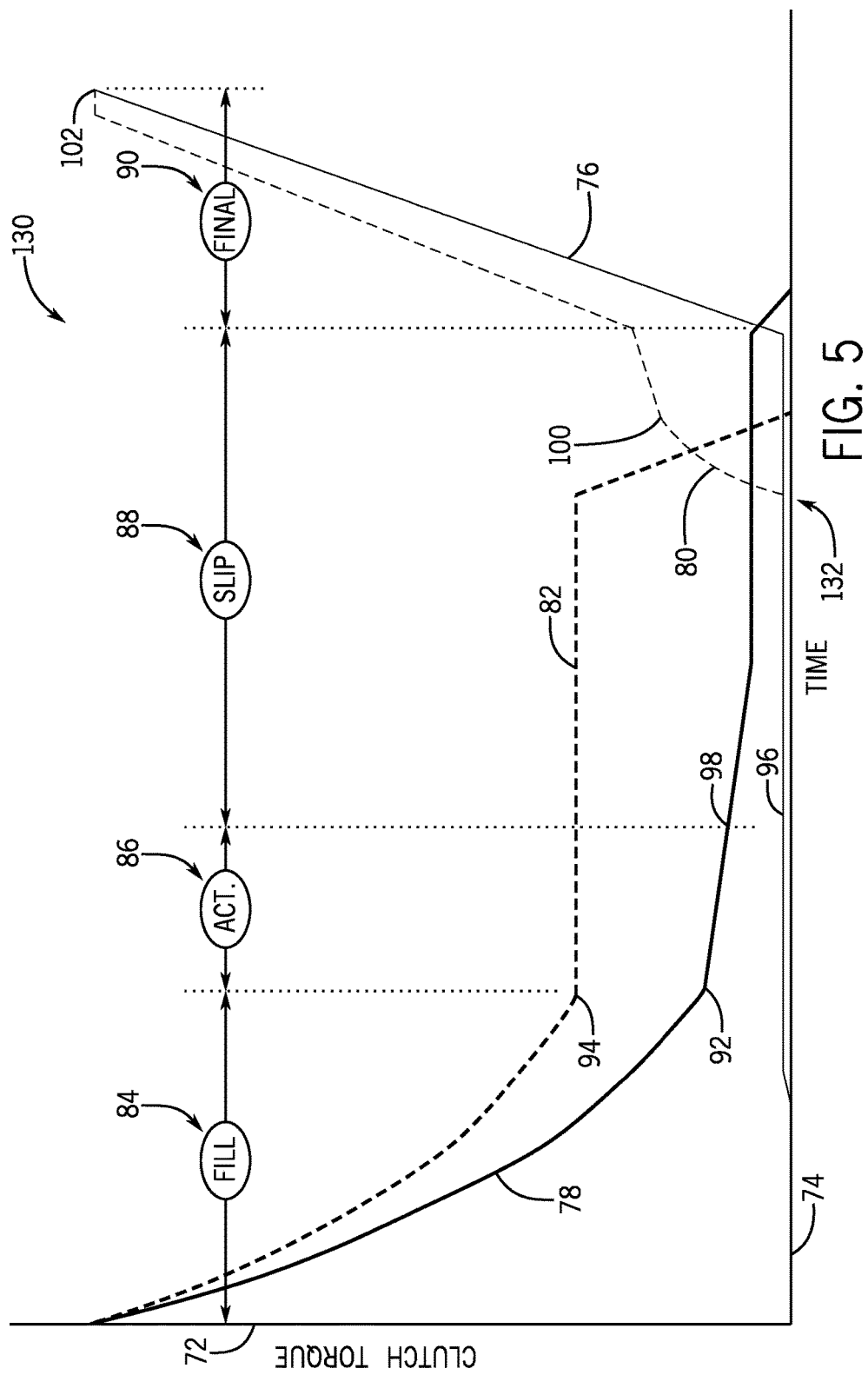
FIG. 5 is a graphical representation of clutch torque capacity over time for a closed loop resisting shift at relatively low torques, in accordance with an aspect of the present disclosure.
Figure 6:
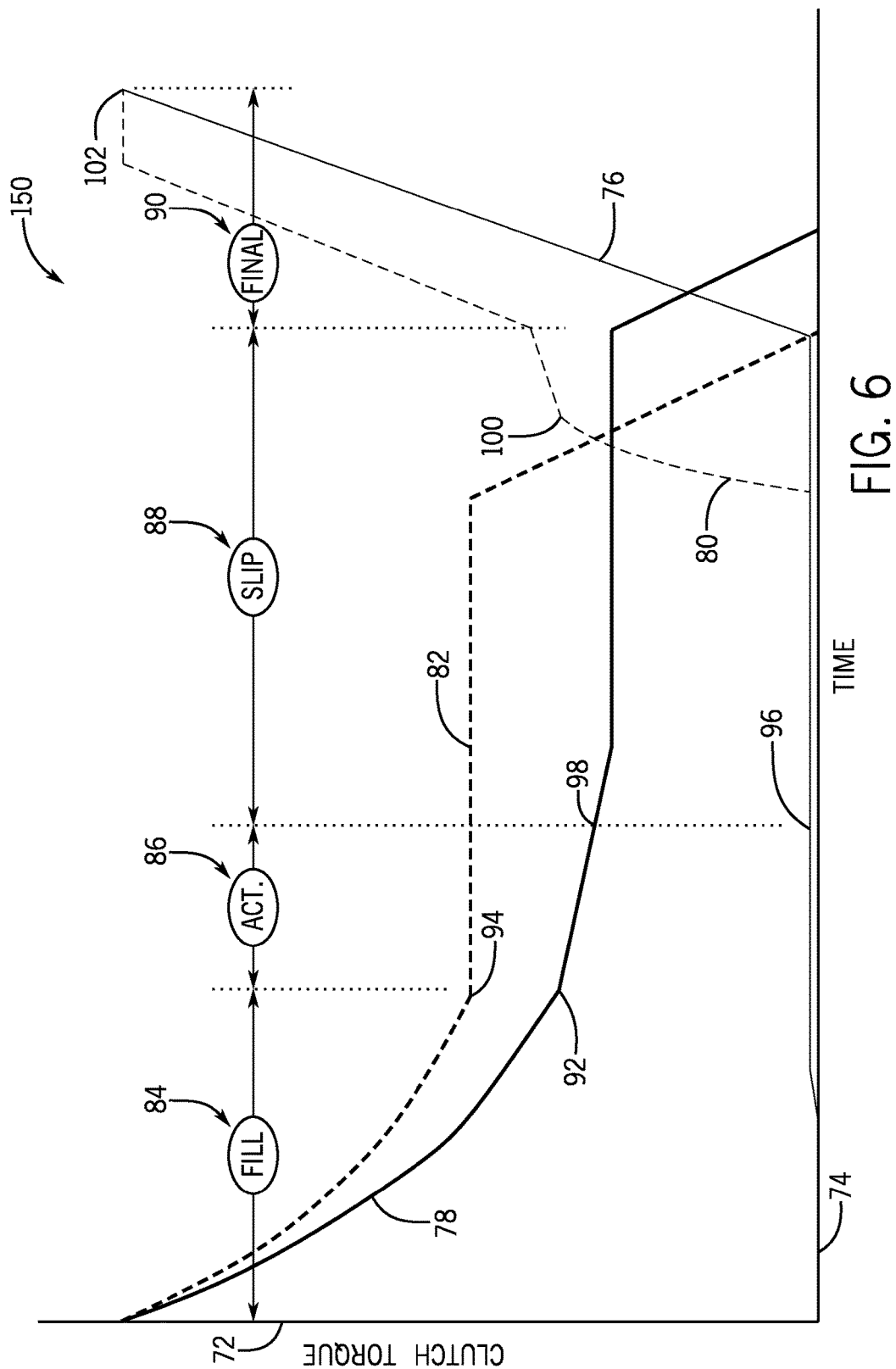
FIG. 6 is a graphical representation of clutch torque capacity over time for a closed loop resisting shift at relatively high torques, in accordance with an aspect of the present disclosure.

Furthermore, during the activation phase 86, the torque of the primary offgoing clutch 78 may be decreased to a fourth torque target 98 (e.g., determined in part from the measured load torque). As shown in FIG. 3, during the driving shift, the fourth torque target 98 may be less than the first torque target 92, and in some cases, the fourth torque target 98 may be substantially zero (e.g., during high torque driving shifts as shown in FIG. 3). Additionally, in some embodiments, the fourth torque target 98 may not be used (e.g., during resisting shifts, as shown in FIGS. 5 and 6).

When the primary oncoming clutch 76 reaches the third torque target 96, the slip phase 88 may begin (e.g., during a closed loop powershift as shown in FIG. 3). During the slip phase 88, the primary and secondary clutches may slip (e.g., begin the process of switching from the offgoing clutch to the oncoming clutch), thereby changing the gear ratio of the transmission 44. During the slip phase 88, a torque of the secondary oncoming clutch 80 may experience a rapid increase toward a fifth torque target 100 (e.g., determined in part from the absolute value of the measured load torque). Increasing the torque of the secondary oncoming clutch 80 to the fifth torque target 100 may control the speed at which the gear ratio changes. Once the gear ratio changes, the final phase 90 may begin.

The torque of one or both of the oncoming clutches 76 and/or 80 increases toward a desired torque capacity value 102, and the torque of both the offgoing clutches 78 and 82 may decrease to substantially zero (the torque capacities of the offgoing clutches 78 and 82 may also decrease to substantially zero during the slip phase 88 or the activation phase 86). In some embodiments, the torque capacity of the secondary oncoming clutch 80 increases to the desired torque capacity value 102 (e.g., swaps) during the slip phase 88 (e.g., during driving shifts). In other embodiments, the torque capacity of the secondary oncoming clutch 80 increases to the desired torque capacity value 102 (e.g., swaps) during the final phase 90 (e.g., during resisting shifts). It may be desirable for the secondary clutch swap (e.g., when torque capacity of the secondary oncoming clutch 80 increases to the desired torque value 102) to occur during the slip phase 88 of a driving shift (e.g., as shown in FIG. 3) in order to reduce a slip speed of the primary oncoming clutch 76, thereby reducing power absorbed by the primary oncoming clutch 76 during the primary clutch swap and thus, reducing engine load. Similarly, it may be desirable for the secondary clutch swap (e.g., when torque capacity of the secondary oncoming clutch increases to the desired torque value 102) to occur later during the slip phase 88 of a resisting shift (e.g., as shown in FIGS. 5 and 6) because the secondary clutch swap may increase the slip speed of the primary offgoing clutch 78, thereby increasing power absorbed by the primary offgoing clutch 78 and increasing engine load.

Determining the torque targets 92, 94, 96, 98, and/or 100 and the timing of the secondary clutch swap with the algorithm enables the control system 11 to perform an appropriate shift. Therefore, the control system 11 may perform a driving shift, a resisting shift, and/or a transitional shift regardless of the load torque, while utilizing a single algorithm. Additionally, the single control algorithm may be configured to determine an output torque (e.g., a torque target) regardless of whether an input torque (e.g., a measured torque, an estimated torque, and/or a desired torque) is positive or negative. For example, an output torque for an upshift may be calculated by dividing the input torque by an absolute value of a gear ratio of the transmission, as shown in Equation 1.

$$\text{output } torque_{upshift} = \frac{\text{input torque}}{\text{abs(gear ratio)}} \qquad (1)$$

Similarly, to determine the output torque for a downshift, the control algorithm may divide a negative input torque by the absolute value of the gear ratio of the transmission, as shown in Equation 2.

$$\text{output } torque_{downshift} = \frac{-(\text{input torque})}{\text{abs(gear ratio)}} \quad (2)$$

Additionally, it may be desirable to utilize a progress ratio to determine a status of the powershift (e.g., how close the powershift is to completion). Traditional controllers may utilize a speed ratio (e.g., output gear speed divided by input gear speed) to determine the status of the powershift; however, the speed ratio may increase during an upshift and decrease during a downshift. The different responses in the speed ratio create different status measures for upshifts and downshifts. Accordingly, it may be desirable to calculate the progress ratio, which may quantify the status of the powershift in a uniform manner, regardless of whether the powershift is an upshift or a downshift. In certain embodiments, the progress ratio may be calculated by dividing a difference between the current gear ratio and the old gear ratio by a difference between the target gear ratio and the old gear ratio, as shown in Equation 3.

$$\text{progress ratio} = \frac{(\text{current gear ratio} - \text{old gear ratio})}{(\text{target gear ratio} - \text{old gear ratio})} \quad (3)$$

Accordingly, the progress ratio may be a value from 0 to 1, for example, as the current ratio progresses from the old gear ratio to the target gear ratio. In certain embodiments, when the progress ratio is a negative number, the control system 11 may determine that the gear ratio is being adjusted in a wrong direction (e.g., increasing instead of decreasing or vice versa) and take corrective action. Additionally, when the progress ratio is greater than 1, the control system 11 may determine that the gear ratio has overshot the desired gear ratio (e.g., the target gear ratio) and take corrective action.

In the illustrated embodiment of FIG. 3, the control system 11 may be configured to perform the driving shift in a closed loop (e.g., versus an open loop). For example, the control system 11 may adjust clutch torque capacities 72 if the progress ratio is greater than or less than a target progress ratio. Such adjustments may occur when the load changes during the shift, or due to inaccuracies in determining or reaching the torque targets 92, 94, 96, 98, and/or 100. In other embodiments, the control system 11 may perform shifts in an open loop (e.g., FIG. 8). When operating under an open loop, the control system 11 may use an algorithm and/or look up tables to determine the torque targets 92, 94, 96, 98, and/or 100 and may not apply any additional adjustments to the clutch torque capacities 72. Additionally, when powershifting in an open loop, the activation phase 86 and the slip phase 88 of the powershift may not occur.

As shown in the illustrated embodiment of FIG. 3, the gear ratio of the transmission 44 may change during the slip phase 88. During the fill phase 84, the oncoming clutches 76 and 80 fill, whereas the torque capacities 72 of the offgoing clutches 78 and 82 decrease (e.g., to the first torque target 92 and the second torque target 94, respectively). At the activation phase 86, the torque capacity 72 of the primary oncoming clutch 76 increases to the third torque target 96, which may be large enough to carry the load on the agricultural vehicle 10. Additionally, the torque capacity 72 of the primary offgoing clutch 78 decreases to the fourth torque target 98, which may be substantially zero. The torque capacity 72 of the secondary offgoing clutch 82 and the secondary oncoming clutch 80 remain substantially constant through the activation phase 86.

At the slip phase 88, the torque capacity 72 of the secondary offgoing clutch 82 decreases (e.g., to a value of substantially zero), and the torque capacity 72 of the secondary oncoming clutch 80 increases to the fifth torque target value 100. During the slip phase 88, the primary oncoming clutch 76 is carrying the load (e.g., primarily carrying the load without another clutch), and the torque capacity 72 of the primary oncoming clutch 76 may increase to move the gear ratio of the transmission 44 toward the final value. At the final phase 90, the primary oncoming clutch 76 is no longer slipping, such that the torque capacity 72 of the primary oncoming clutch 76 may increase toward the desired torque capacity with no further effect on the gear ratio of the transmission 44.

Figure 4:
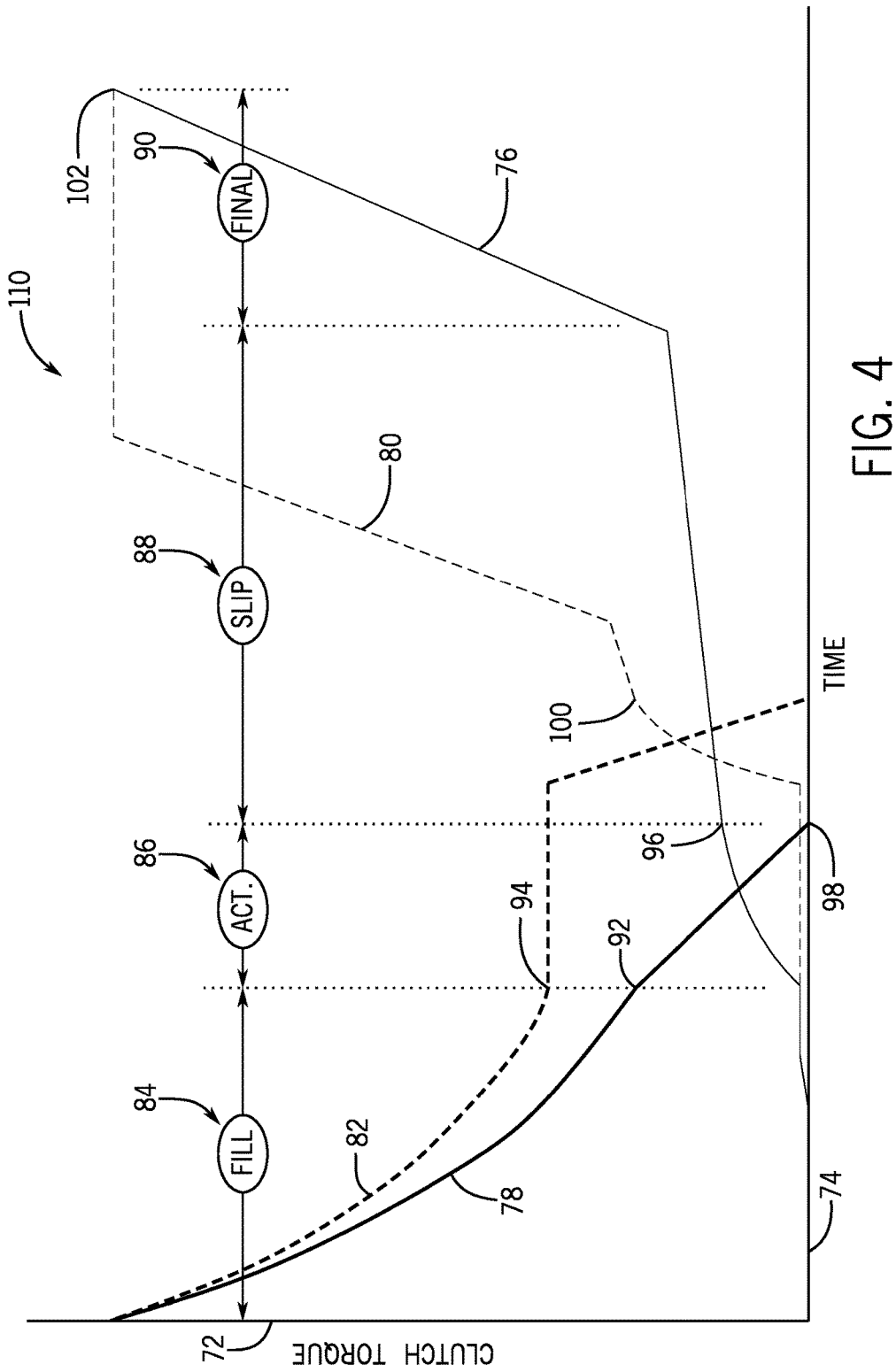
FIG. 4 is a graphical representation of clutch torque capacity over time for a closed loop driving shift at a relatively low torque, in accordance with an aspect of the present disclosure.

FIG. 4 is a chart 110 illustrating the clutch torque capacity 72 as a function of time 74 for a closed loop driving shift at a relatively low torque. As compared to a driving shift at high torque (e.g., FIG. 3), the torque capacities 72 of the oncoming clutches 76 and 80 do not increase as significantly during the activation phase 86. Because a low torque is demanded by the agricultural vehicle 10, the torque capacities 72 of the primary and secondary oncoming clutches 76 and 80 may not increase as much during the activation phase 86 when compared to conditions in which the agricultural vehicle 10 demands a higher torque (e.g., when compared to FIG. 3). However, when operating under both high torque and low torque conditions, the torque capacities 72 reached by the oncoming clutches 76 and 80 may enable the transmission 44 to ultimately achieve the desired ratio.

FIG. 5 is a chart 130 illustrating clutch torque capacity 72 as a function of time 74 for a closed loop resisting shift at relatively low torques. As shown, an increase in torque capacity 72 of the secondary oncoming clutch 80 to the fifth torque target 100 occurs later than in a driving shift (e.g., FIGS. 3 and 4). As discussed above, during a resisting shift, the primary offgoing clutch 78 resists the change in gear ratio, thereby increasing the duration of the gear ratio change (e.g., time for the slip to occur). The gear ratio of the transmission 44 may change during the slip phase 88. During the slip phase 88, the primary offgoing clutch 78 is carrying the load, and the torque capacity 72 of the primary offgoing clutch 78 may be reduced to enable the ratio to move toward the final value. The increase in torque capacity 72 of the secondary oncoming clutch 80 to the fifth torque target 100 may begin at a ratio threshold 132. In certain embodiments, the ratio threshold 132 may be chosen such that when the secondary swap is complete, an actual (e.g., measured) ratio is substantially equal to the desired ratio in the new gear, resulting in near zero slippage at the primary oncoming clutch 76.

FIG. 6 is a chart 150 illustrating clutch torque capacity 72 as a function of time 74 for a closed loop resisting shift at relatively high torques. The increase in the secondary oncoming clutch 80 to the fifth torque target 100 occurs at substantially the same time as that in a resisting shift at low torque (e.g., FIG. 5); however, the fifth torque target 100 for the high torque shift is higher than the fifth torque target 100 for the low torque resisting shift.

Figure 7:
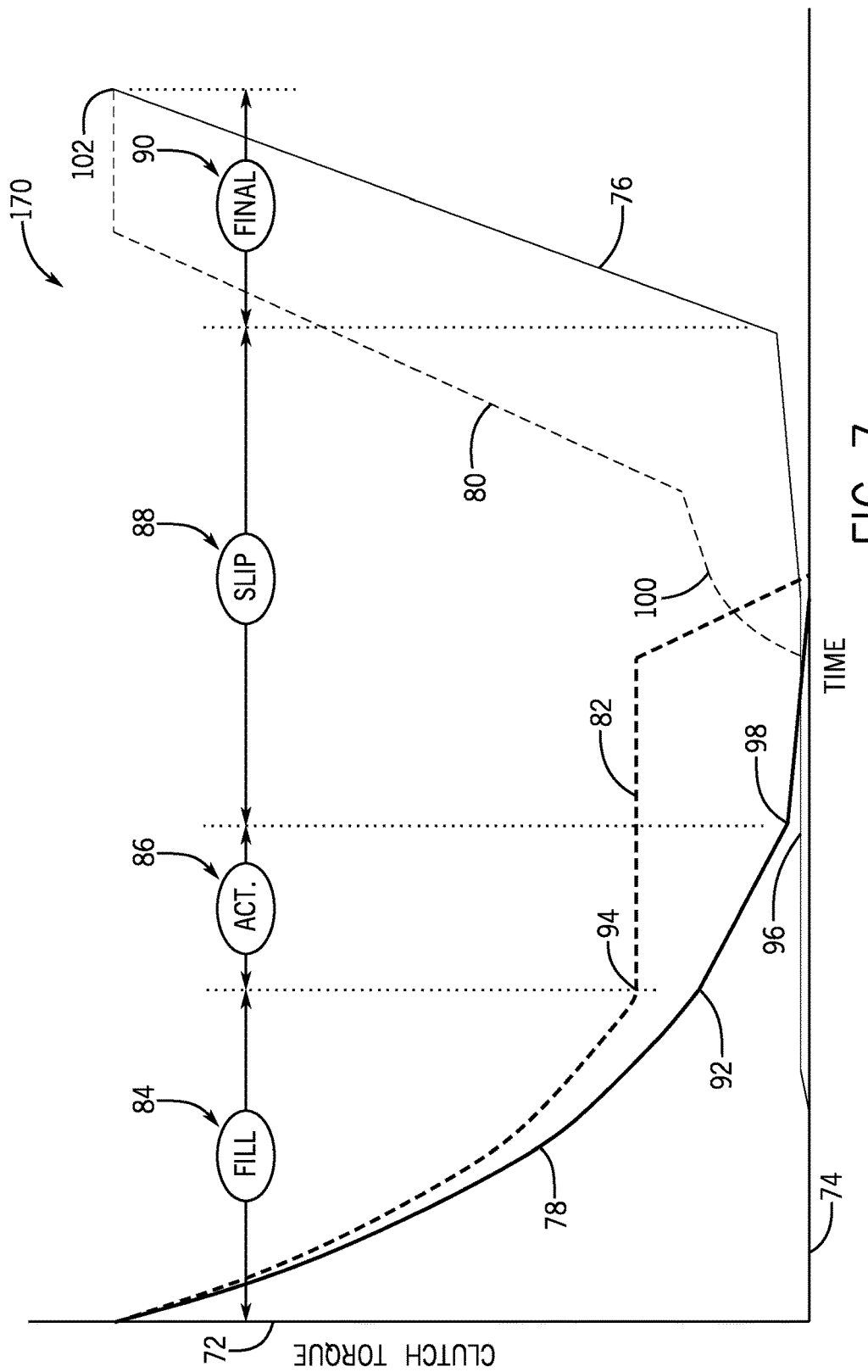
FIG. 7 is a graphical representation of clutch torque capacity over time for a closed loop transitional shift at relatively low torque, in accordance with an aspect of the present disclosure

FIG. 7 is a chart 170 illustrating clutch torque capacity 72 as a function of time 74 for a closed loop transitional shift at relatively low torque. As shown, the increase of the secondary oncoming clutch 80 to the fifth torque target 100 does not occur as early as compared to a driving shift (e.g., FIGS. 3 and 4) or as late as compared to a resisting shift (e.g., FIGS. 5 and 6). Transitional shifts occur during operating conditions between driving shifts and resisting shifts. Accordingly, the primary offgoing clutch 78 initially resists shifting during a transitional shift, but when the torque capacity 72 of the primary offgoing clutch 78 is reduced to substantially zero, the torque capacity 72 of the secondary oncoming clutch 80 starts increasing toward the fifth torque target 100.

Figure 8:
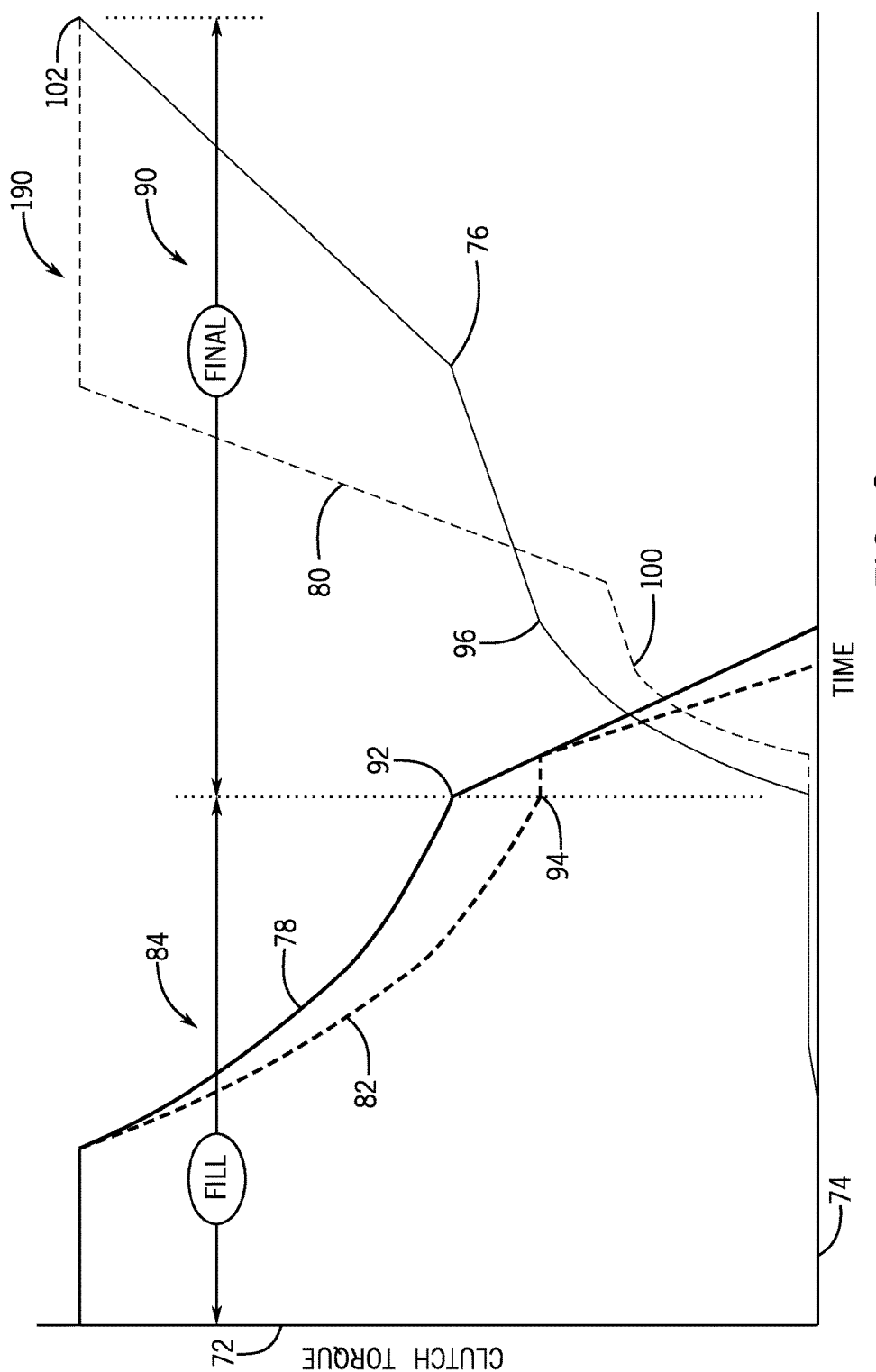
FIG. 8 is a graphical representation of clutch torque capacity over time for an open loop shift, in accordance with an aspect of the present disclosure.

FIG. 8 is a chart 190 illustrating clutch torque capacity 72 as a function of time 74 for an open loop shift (e.g., as compared to a closed loop shift shown in FIGS. 3-7). As shown in the illustrated embodiment of FIG. 8, the activation phase 86 and the slip phase 88 are not used during open loop shifts. Accordingly, both the primary and secondary oncoming clutches 76 and 80 slip during the final phase 90.

Figure 9:
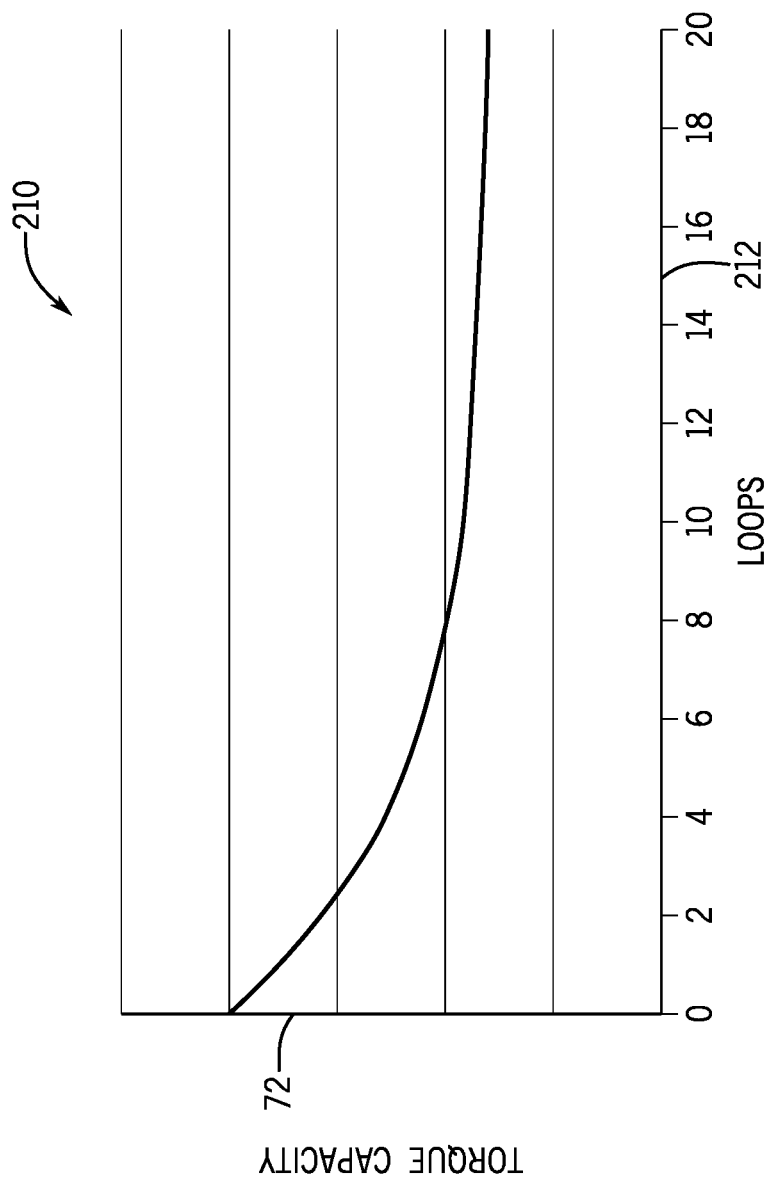
FIG. 9 is a graphical representation of clutch torque capacity versus a number of control loops, in accordance with an aspect of the present disclosure.

The control system 11 may be configured to enable a smooth transition between torque capacities 72 (e.g., smooth adjustments between torque targets 92, 94, 96, 98, and/or 100) of the various clutches (e.g., the primary oncoming clutch 76, the primary offgoing clutch 78, the secondary oncoming clutch 80, and/or the secondary offgoing clutch 82). For example, FIG. 9 is a chart 210 illustrating clutch torque capacity 72 as a function of a number of control cycles 212 to show how the control system 11 adjusts the torque capacities 72 of the clutches 76, 78, 80, and/or 82 such that the torque capacities 72 may reach the torque target values 92, 94, 96, 98, and/or 100. As shown, the curve 210 is relatively smooth such that the overshoot and oscillation of the target torque value 92, 94, 96, 98, and/or 100 may be substantially reduced.

In certain embodiments, the control system 11 may determine a step size (e.g., an amount that the torque capacity is changed) during each individual control cycle 212 based on the number of control cycles 212 remaining, a target torque 92, 94, 96, 98, and/or 100, a starting torque value, and a tunable factor. In some embodiments, the control system 11 may be configured to select the tunable factor from the larger of a predetermined tunable factor (e.g., input by an operator) and an inverse of the amount of control cycles 212 remaining. The predetermined tunable factor may be a fraction between 0 and 1 (e.g., 0.1, 0.2, 0.3, 0.4, 0.5). The number of control cycles 212 may be determined based at least on a time to execute an individual control cycle 212 (e.g., when operating under a closed loop) and a time to change torque capacity (e.g., a duration of a shift phase).

For example, the torque capacity of a clutch 72 may be adjusted from a starting value to the torque target 92, 94, 96, 98, and/or 100 on an incremental basis. Accordingly, an individual control cycle 212 may include a single adjustment of the torque capacity 72 performed by the control system 11. The magnitude of the single adjustment may be the larger of the predetermined tunable factor and the inverse of the amount of control cycles 212 remaining, times a remaining torque change (e.g., the target torque minus a torque determined during the previous control cycle). Additionally, the time to change torque capacity 72 may be the total time that it takes for the torque capacity 72 to change from the starting value to the torque target 92, 94, 96, 98, and/or 100. Accordingly, the number of control cycles 212 that may be executed during the time to change torque capacity 72 may determine the amount of control cycles 212 that may be used to ultimately change the torque capacity 72 from the starting torque capacity to the target torque capacity 92, 94, 96, 98, and/or 100.

Utilizing the larger of the predetermined tunable factor (e.g., 0.2) and the inverse of the number of control cycles 212 remaining forms a smooth curve that may enable the control system 11 to reduce the possibility of overshooting the target torque capacity 92, 94, 96, 98, and/or 100, and/or oscillating about the target torque capacity 92, 94, 96, 98, and/or 100. Accordingly, the algorithm may enable the control system 11 to efficiently reach the target torque capacity value 92, 94, 96, 98, and/or 100 (e.g., reach the target torque capacity value accurately and quickly). Additionally, the algorithm may enable a clutch to reach the target torque capacity 92, 94, 96, 98, and/or 100 even when the target torque capacity 92, 94, 96, 98, and/or 100 changes during the transition between torque capacities 72.

Figure 10:
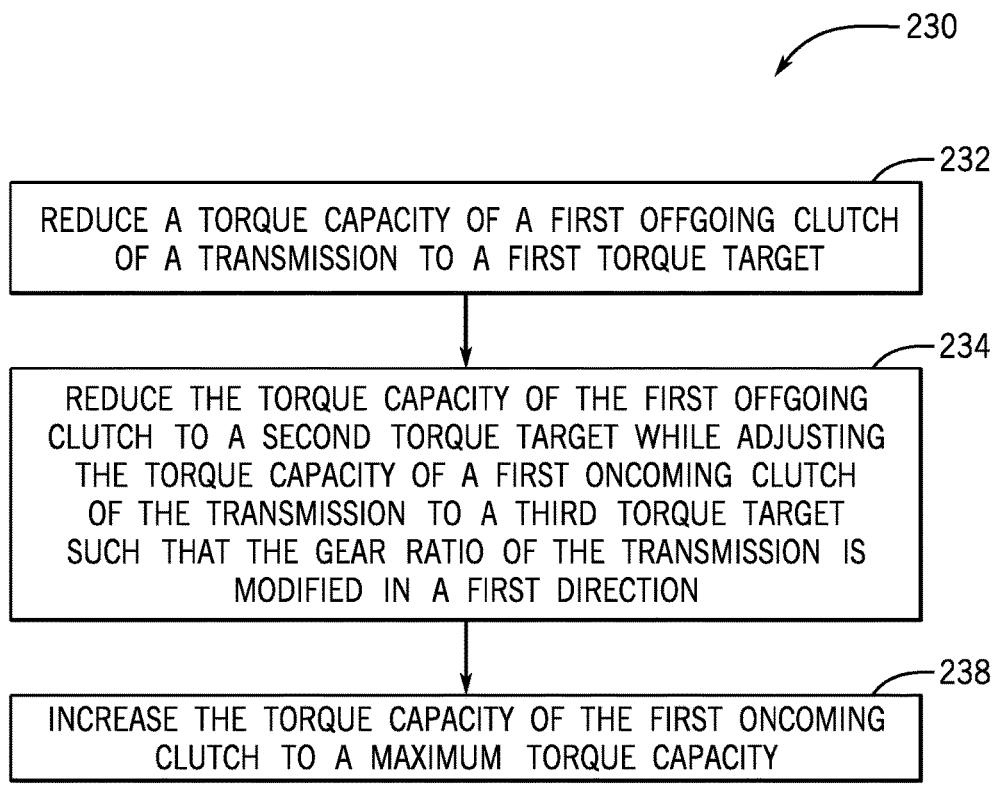
FIG. 10 is a block diagram of an embodiment of a process that may be used to perform one or more of the shifts illustrated in FIGS. 3-9, in accordance with an aspect of the present disclosure.

FIG. 10 is a block diagram of an embodiment of a process 230 that may be utilized by the control system 11 to perform a driving shift (e.g., FIGS. 3 and 4), a resisting shift (e.g., FIGS. 5 and 6), a transitional shift (e.g., FIG. 7), and/or an open loop shift (e.g., FIG. 8). For example, at block 232 the control system 11 may reduce the torque capacity 72 of the primary offgoing clutch 78 to the first torque target 92. Additionally, the control system 11 may be configured to reduce the torque capacity 72 of the second offgoing clutch 82 to the second torque target 94. At block 234, the control system 11 may further reduce the torque capacity 72 of the primary offgoing clutch 78 to the fourth torque target 98 (e.g., a second torque target when no secondary clutches are used). Additionally, the control system 11 may further reduce the torque capacity 72 of the secondary offgoing clutch 82 to a minimum value (e.g., substantially zero). While further reducing the torque capacity 72 of the primary offgoing clutch 78 and/or the secondary offgoing clutch 82, the control system 11 may adjust the primary oncoming clutch 76 to the third torque target 96 and/or adjust the secondary oncoming clutch 80 to the fifth torque target (e.g., simultaneously with reducing the torque capacity 72 of the primary offgoing clutch 78 and/or the secondary offgoing clutch 82).

Accordingly, the control system 11 may modify a gear ratio of the transmission 44. For example, the gear ratio of the transmission 44 may be modified in a first direction (e.g., in the same direction as the gear ratio change) when the primary offgoing clutch 78 and the primary oncoming clutch 76 slip (e.g., a torque load of the transmission 44 switches from the primary offgoing clutch 78 to the primary oncoming clutch 76). Further, the gear ratio of the transmission 44 may be modified in a second direction opposite the first direction (e.g., in the opposite direction as the gear ratio change) when the secondary offgoing clutch 82 and the secondary oncoming clutch 80 slip (e.g., a torque load of the transmission 44 switches from the secondary offgoing clutch 82 to the secondary oncoming clutch 80). In some embodiments, the secondary clutches 80, 82 may modify the gear ratio in the opposite direction to offset the change in the gear ratio caused by the primary clutch switch.

At block 238, the torque capacity 72 of the primary oncoming clutch 76 may be increased to the desired torque capacity value 102. Additionally, in some embodiments (e.g., transmissions that include dual clutches), the torque capacity 72 of the secondary oncoming clutch 80 may also be increased to the desired torque capacity value 102. Accordingly, the shift may be complete, and the transmission 44 may supply a desired amount of torque to the wheels 16 of the vehicle 10.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An agricultural vehicle, comprising:
an engine;
a transmission with multiple gear ratios driven by the engine; and
a controller that, in operation, adjusts a gear ratio of the transmission using an algorithm, wherein the algorithm, in operation, performs the following steps:
reduce a torque capacity of a first offgoing clutch of the transmission to a first torque target;
reduce a torque capacity of a second offgoing clutch of the transmission to a second torque target;
once the first and second offgoing clutches reach the first and second torque targets, respectively, adjust a torque capacity of a first oncoming clutch of the transmission to a third torque target such that the gear ratio of the transmission is modified in a first direction; and
after the first oncoming clutch reaches the third torque target, increase the torque capacity of the first oncoming clutch to a desired torque capacity,
wherein the algorithm, in operation, adjusts the torque capacities of the first offgoing clutch and the first oncoming clutch on an incremental basis over a number of individual control cycles to reach a respective torque target from a starting torque capacity.

2. The agricultural vehicle of claim 1, wherein the algorithm, in operation, performs the following steps:
after the first oncoming clutch reaches the third torque target, increase a torque capacity of a second oncoming clutch to the desired torque capacity.

3. The agricultural vehicle of claim 1, wherein the algorithm, in operation, determines a step size of the torque capacity based on the number of individual control cycles remaining to reach the respective torque target from the starting torque capacity, the first torque target, the second torque target, the third torque target, the starting torque capacity, a tunable factor, or any combination thereof.

4. The agricultural vehicle of claim 3, wherein the tunable factor comprises a predetermined tunable factor, an inverse of the number of individual control cycles remaining, or both.

5. The agricultural vehicle of claim 1, wherein the controller, in operation, adjusts torque capacities of the first offgoing clutch and the first oncoming clutch of the transmission for a driving shift, a resisting shift, a transitional shift, or any combination thereof.

6. The agricultural vehicle of claim 1, wherein the algorithm, in operation, adjusts the torque capacity of the first offgoing clutch to the first torque target and adjusts the torque capacity of the first oncoming clutch to the third torque target, such that overshoot of the first and third torque targets, oscillation about the first and third torque targets, or both are reduced.

7. The agricultural vehicle of claim 1, wherein the algorithm, in operation, adjusts the torque capacities of the first offgoing clutch and the first oncoming clutch of the transmission at generally high torque loads on the transmission and at generally low torque loads on the transmission.

8. An agricultural vehicle, comprising:
an engine;
a transmission with multiple gear ratios driven by the engine; and
a controller that, in operation, performs the following steps:
reduce a torque capacity of a first offgoing clutch of the transmission to a first torque target during a fill phase of a transmission shift;
adjust the torque capacity of a first oncoming clutch of the transmission to a second torque target during an activation phase of the transmission shift, such that a gear ratio of the transmission is modified in a first direction during a slip phase of the transmission shift, wherein the activation phase begins when the torque capacity of the first offgoing clutch reaches the first torque target, and wherein the slip phase begins when the torque capacity of the first oncoming clutch reaches the second torque target;
calculate a progress ratio during the slip phase; and
increase the torque capacity of the first oncoming clutch to a desired torque capacity during a final phase of the transmission shift that occurs after the slip phase.

9. The agricultural vehicle of claim 8, wherein the controller, in operation, performs the following steps:
reduce the torque capacity of a second offgoing clutch of the transmission to a third torque target during the fill phase;
adjust the torque capacity of a second oncoming clutch of the transmission to a fourth torque target during the activation phase, wherein the activation phase begins when the torque capacity of the both of the first and second offgoing clutches reach the first and third torque targets, respectively; and
increase the torque capacity of the second oncoming clutch to the desired torque capacity during the final phase.

10. The agricultural vehicle of claim 8, wherein the controller, in operation, adjusts the torque capacities of the first offgoing clutch and the first oncoming clutch of the transmission during a driving shift, a resisting shift, a transitional shift, an upshift, a downshift, or any combination thereof.

11. The agricultural vehicle of claim 10, wherein the controller comprises a common algorithm that, in operation, adjusts the torque capacities of the first offgoing clutch and the first oncoming clutch of the transmission for the driving shift, the resisting shift, the transitional shift, the upshift, and the downshift.

12. The agricultural vehicle of claim 8, wherein the progress ratio is a measure of how far the gear ratio has progressed from an initial gear ratio toward a target gear ratio.

13. The agricultural vehicle of claim 8, wherein the algorithm, in operation, adjusts the torque capacity of the first offgoing clutch to the first torque target and adjusts the torque capacity of the first oncoming clutch to the second torque target, such that overshoot of the first and second torque targets, oscillation about the first and second torque targets, or both are reduced.

* * * * *